(No Model.)
J. POTTER.
GRIDDLE OR PAN LUBRICATOR.
No. 279,181. Patented June 12, 1883.
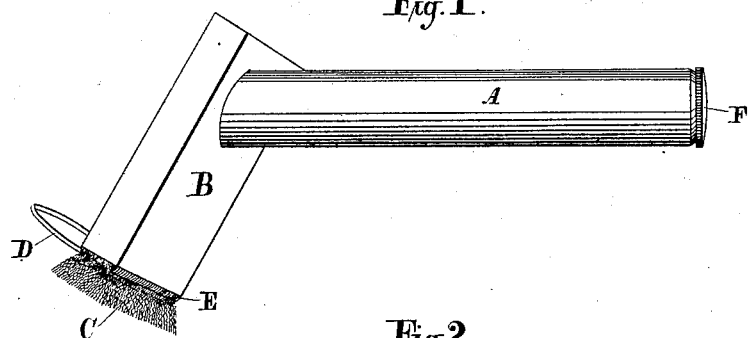
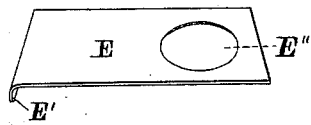
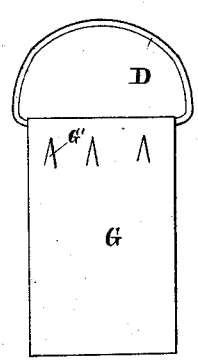
Fig. 4.
Fig. 5.
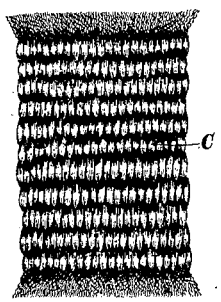
Fig. 6.
Witnesses:
Inventor:
James Potter
per J. D. Clark
Attorney.

UNITED STATES PATENT OFFICE.

JAMES POTTER, OF CHICAGO, ILLINOIS.

GRIDDLE OR PAN LUBRICATOR.

SPECIFICATION forming part of Letters Patent No. 279,181, dated June 12, 1883.

Application filed October 19, 1882. (No model.)

*To all whom it may concern:*

Be it known that I, JAMES POTTER, a citizen of the United States, residing at Chicago, in the county of Cook and State of Illinois, have invented and produced a new and original lubricator for lubricating the heated or non-heated surfaces of griddles or pans and other well-known articles of domestic and culinary use.

My invention consists in a novel arrangement of a grease cylinder-cup or lubricant-holder, and a novel construction and arrangement of devices employed in connection therewith, whereby the lubricant is supplied in uniform quantities from the cylinder-reservoir to the heated surface of griddle or pan, and, after once using on a heated surface and the lubricant is drawn into the wick conductor, can be used at any time on a non-heated surface.

The object of my invention is to provide a simple and effective device whose special advantage or superiority will be its economy in the use of butter or other lubricants, the marked absence of smoke in lubricating a heated surface, and the ease of application to a non-heated surface. Such a lubricating device forms a new article of manufacture, which is cheap and durable, may be easily handled, and readily applied to any surface desired to be lubricated.

The following specification shows fully the manner of construction, as well as the manner of applying my invention, reference being had to the accompanying drawings, forming part thereof.

Figure 1 is a vertical view of my device. Fig. 2 is also a vertical view of my lubricator, with sliding clamps and wick conductor partially drawn out of the receiver; Fig. 3, a perspective view of one of the clamps for holding the wick; Fig. 4, a side view of the opposite clamp for holding the wick; Fig. 5, an end elevation of same clamp, showing particularly the barb or point; Fig. 6, a vertical view of the wick conductor.

Similar letters refer to similar parts throughout the several views.

A is the cylinder or reservoir, and is made hollow, is filled, when wanted for use, with grease, or other lubricating material that will retain a firm consistency or solidity during ordinary atmospheric temperatures, but will readily soften when other parts of the device, which are connected therewith are brought in contact with a heated surface. B is the receiver of the wick, which is soldered fast to the cylinder A, and where it is joined has an aperture cut very near the size in diameter of the cylinder, through which the lubricant flows on its way to the wick conductor C.

C is the wick, which is composed of wool, cotton, or any other substance that will form a lubricant-conductor. The wick C is held on either side by sliding clamps, which slide in and out on either side of the receiver, and are intended to introduce the said wick into the receiver and draw it out therefrom when necessary to renew the length of the part of the wick that comes in contact with the heated surfaces of any article, which friction may wear it down, and consequently its renewal or the inserting of a new wick is necessary, which can be done at a slight cost.

D is the ring which draws the wick from the receiver, and also assists in returning the same, and is meant also to be the means of hanging the device upon a nail or hook when not in use. In the clamp E one end, E', is bent at right angles with its length, whose object is to assist in holding the wick-conductor in place, and also to help it to and from receiver. The other end of clamp E has an opening or orifice, E'', cut in its face, through which the lubricant flows on its way from cylinder A to the wick C.

F is a screw-cap on the reservoir A, which is meant to hold the lubricant from flowing backward. G is another clamp, opposite clamp E, for holding the wick C in position. One end of said clamp embraces the ring D in the well-known method of holding loose rings. The clamp G is provided with a series of points or barbs, G', projecting from one side of its face, which stand in an obtuse angle with the length thereof, whose object is to assist in holding the grease-conducting wick from being forced back into the receiver when the lubricator is in use, and also to assist the ring D to draw the wick out of the receiver.

The butter, lard, or other ingredient used as a lubricant is inserted in the cylinder A through the opening A', and the screw-cap F is attached. The wick and its clamps being put in position, as shown in Fig. 1, or in the receiver B, the wick is then warmed by being brought in contact with the heated surface of a griddle or pan, and the butter or other ingredient flows spontaneously through the openings in receiver B and clamp E and saturates the wick, and the application of the wick greases the surface required to be lubricated. For a non-heated surface there will be enough grease left in the wick conductor to supply the want.

Other devices can be employed than the clamps E and G for holding the wick C in position while being drawn from or placed in the receiver B, so long as they accomplish the object wanted. Other means than the barbs G' can be used, so long as they do the work required— the holding of the wick in place and preventing it from being forced back into the receiver when in use.

I do not necessarily confine my receiver to a square shape. If, in the use of the lubricator, I find that the surface of the wick conductor is not large enough for the work demanded of it by some surfaces to be lubricated, I can employ a cylinder-shaped receiver, which will of necessity increase the cost of manufacture; but my object is to place before the public as cheap and durable an article as can be made in the square shape, and to that effect I have limited my drawings.

My lubricator is made from tin or zinc.

What I claim, and desire to secure by Letters Patent of the United States, is—

1. A fountain griddle or pan lubricator, in combination with a wick, or its equivalent, to convey the required amount of lubricant from a supply-chamber to the surface to be lubricated, all for the purpose specified.

2. In a fountain griddle or pan lubricator, the cylinder-cup or reservoir A, with screw-cap F and receiver B, which may be either square or cylindrical in shape, all for the purpose specified.

3. In a fountain griddle or pan lubricator, the sliding clamp E, with projection E', or its equivalent, to assist the wick C in and out of the receiver B, and orifice or opening E'', all for the purpose specified.

4. In a fountain griddle or pan lubricator, the sliding clamp G, provided with barbs or points G', or their equivalent, whose special use is to hold the wick C from being forced back into the receiver B while the lubricator is in operation, all for the purpose specified.

JAMES POTTER.

Witnesses:
   JNO. J. HUBBARD,
   ALEXANDER MACDONALD.